United States Patent
Brothers et al.

(10) Patent No.: US 7,098,271 B2
(45) Date of Patent: Aug. 29, 2006

(54) THERMALLY CROSS-LINKED FLUOROPOLYMER

(75) Inventors: Paul Douglas Brothers, Chadds Ford, PA (US); Patrick Edward Lindner, Kennett Square, PA (US); Peter Dwight Spohn, Brookline, NH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 601 days.

(21) Appl. No.: 10/341,885

(22) Filed: Jan. 14, 2003

(65) Prior Publication Data

US 2003/0139534 A1    Jul. 24, 2003

Related U.S. Application Data

(62) Division of application No. 09/315,186, filed on May 20, 1999, now Pat. No. 6,559,238.

(60) Provisional application No. 60/091,104, filed on Jun. 29, 1998.

(51) Int. Cl.
*C08F 8/32* (2006.01)

(52) U.S. Cl. .................. 525/285; 525/326.3; 525/374; 525/378; 525/379; 525/381; 525/382

(58) Field of Classification Search ................ 525/285, 525/374, 378, 379, 381, 382
See application file for complete search history.

(56) References Cited

U.S. PATENT DOCUMENTS

| 4,353,961 | A | | 10/1982 | Gotcher et al. ............. 428/380 |
|---|---|---|---|---|
| 5,223,562 | A | | 6/1993 | Sagawa et al. ............. 524/275 |
| 5,409,997 | A | | 4/1995 | Murphy ...................... 525/274 |
| 5,576,106 | A | | 11/1996 | Kerbow et al. ............. 428/403 |
| 5,677,389 | A | * | 10/1997 | Logothetis et al. ......... 525/340 |

FOREIGN PATENT DOCUMENTS

| DE | 196 42 029 A1 | 4/1997 |
|---|---|---|
| EP | 0 121 934 | 10/1984 |
| EP | 0 150 725 | 8/1985 |
| EP | 0 212 508 | 3/1987 |
| EP | 0 312 834 | 4/1989 |
| EP | 0 371 599 | 6/1990 |
| EP | 0 416 501 A2 | 3/1991 |
| EP | 0 650 987 A1 | 5/1995 |

* cited by examiner

*Primary Examiner*—Bernard Lipman

(57) ABSTRACT

Melt-fabricable thermoplastic fluoropolymer having pendant functional groups is thermally cross-linked in the presence of polyfunctional nucleophile.

16 Claims, No Drawings

THERMALLY CROSS-LINKED FLUOROPOLYMER

This application is a division of 09/315,186 May 20, 1999 now U.S. Pat. No. 6,559,238. Which is a non-provisional of provisional 60/091,104 Jun. 29, 1998 Expired.

FIELD OF THE INVENTION

This invention is in the field of thermoplastic fluoropolymers, more particularly crosslinked thermoplastic fluoropolymers.

BACKGROUND OF THE INVENTION

Thermoplastic fluoropolymers are well known for outstanding combinations of properties including chemical resistance, unique surface characteristics, high service temperatures, and good dielectric characteristics. As a result, fluoropolymer resins are used in a wide variety of applications including wire insulation, cable tubing, film, linings for chemical process equipment, articles for fluid handling in laboratory and manufacturing situations, and the like. The service temperature in some of these applications can be high. As is common for thermoplastics, some properties of fluoropolymers change as temperature increases. Modulus and tensile strength, for example, typically decrease with increasing temperature.

Efforts have been made to improve the physical characteristics of fluoropolymers at elevated temperatures, largely by cross-linking. Approaches to cross-linking usually involve the incorporation of a cross-linking promoter, also called a coagent, such as triallyl cyanurate or triallyl isocyanurate (U.S. Pat. No. 5,353,961) or metallic diacrylate (U.S. Pat. No. 5,409,997) into a fluoropolymer such as ETFE copolymer, followed by treatment with ionizing radiation to effect the cross-linking.

Improved ways to cross-link fluoropolymers and thereby achieve improved properties are desired.

SUMMARY OF THE INVENTION

This invention provides a cross-linked fluoropolymer, the fluoropolymer being thermoplastic and melt-fabricable prior to cross-linking, wherein the cross-linking of the fluoropolymer is carried out thermally.

The invention also provides a process for cross-linking a melt-fabricable thermoplastic fluoropolymer having pendant functional groups, comprising combining the fluoropolymer with cross-linking promoter before melt fabrication of the fluoropolymer into a shaped article is completed, and then completing melt fabrication. The fluoropolymer can also be shaped into an article before exposure to the cross-linking promoter, which is then infused into the article. Preferred cross-linking promoters are nucleophiles, and include monofunctional and polyfunctional amines.

DETAILED DESCRIPTION

It has been discovered that functionalized fluoropolymer can be effectively cross-linked by a thermal process that does not require the costly use of ionizing radiation and the expensive equipment necessary for such treatment. Functionalized fluoropolymer that can be so cross-linked has pendant functional groups and is melt-fabricable prior to cross-linking. The cross-linking takes place in the presence of cross-linking promoter. Since the cross-linking occurs thermally, the cross-linking process can be coordinated with the fabrication of the melt-fabricable fluoropolymer into a shaped article.

As used herein, "thermal process" and "occurs thermally" are understood to mean that the cross-linking process of the invention is activated by temperature alone. It suffices that functionalized fluoropolymer and cross-linking promoter are brought together and intermixed, and the temperature is raised to at least a level sufficient to activate cross-linking for a time sufficient to achieve the desired cross-linking. One skilled in the art will recognize that the time required to achieve cross-linking will in general depend on the temperature, with cross-linking occurring more rapidly as temperature increases. Typically, a temperature of at least 75° C. and more often at least 100° C. will be required for cross-linking to occur to any appreciable extent. Thus, cross-linking initiation as might be provided by such means as a catalyst or by ionizing radiation is not necessary. One skilled in the art will recognize the possibility that the thermal cross-linking of the invention could be supplemented by such auxiliary means. Such supplemented cross-linking processes are within the scope of the present invention if cross-linking occurs in the absence of such auxiliary means.

The cross-linking promoter used in the thermal cross-linking of the instant invention is present in minor amount. When the cross-linking promoter is a low molecular weight compound, such as a compound having a molecular weight of 500 or less, the amount of cross-linking promoter will generally be no more than 2 wt % based on the weight of fluoropolymer resin, usually no more than 1 wt %. The amount of such cross-linking promoter present is generally at least 0.01 wt %, more commonly at least 0.05 wt %, based on weight of fluoropolymer. When cross-linking promoter is polymeric, then larger amounts of cross-linking promoter can be used, such as 3–30 wt % based on combined weight of fluoropolymer and cross-linking promoter, more commonly 10–25 wt %. Cross-linking promoter should be stable by itself at processing temperatures.

Cross-linking promoters that can be used include nucleophiles, including monofunctional and polyfunctional nucleophiles. Preferred nucleophiles include amines, including primary and secondary amines. Polyfunctional amines that can be used include, for example, aromatic diamines such as para-phenylenediamine, meta-phenylenediamine and methylene dianiline, aliphatic diamines such as 1,6-diaminohexane, and aliphatic triamines such as bis(hexamethylene) triamine. Monofunctional amines that can be used include, for example, aniline, diethyl amine and ammonia. The use of monofunctional cross-linking promoters is particularly surprising. Polymeric cross-linking promoters that can be used in the present invention include polyamides. One skilled in the art will recognize that more than one cross-linking promoter can be used. Thus, at least one cross-linking promoter is used.

Since the cross-linking of the present invention occurs thermally, it is difficult to provide a cross-linkable composition, containing fluoropolymer having pendant functional groups and cross-linking promoter, in conventional cube form because such cubes are normally prepared by melt extrusion, i.e., a high-temperature process which would promote the thermal cross-linking and render the composition less suitable or unsuitable for subsequent fabrication into desired articles or shapes. Additionally, some care must be exercised so that thermal cross-linking does not take place too rapidly and/or to too great a degree within melt processing equipment, e.g., an extruder or an injection molding machine, and thereby impede or even prevent the flow of resin within or out of the equipment. Cross-linking promoter and fluoropolymer having pendant functional groups can first be combined in desired proportions at room temperature, and the mixture then shaped by the intended melt fabrication technique, in which case the cross-linking temperature will usually be at least 250° C. and more often at least 275° C. Promoter and fluoropolymer can be blended with each other in the dry state, such as by tumbling in a drum, or can be combined by simultaneous or separate metering of the feed of one or more of the components to the melt processing device. As illustrated by examples below, low molecular weight cross-linking promoter can also be deposited on fluoropolymer resin from a solution of promoter in an appropriate solvent. Preliminary combining of promoter and fluoropolymer can be satisfactory if residence time in the melt processing equipment is relatively short, but may not be satisfactory if residence time is relatively long or cross-linking is relatively rapid. Promoter and functionalized fluoropolymer can also be combined during melt processing in a way that reduces residence time of the melt-processible composition of the invention in the melt processing equipment, thereby reducing or avoiding the risk of undesired melt viscosity (MV) increase inside the equipment. This can be accomplished, for example, by injecting promoter, such as in a solution, into the melt of fluoropolymer having pendant functional groups as it (the melt) is transported along the barrel of a melt extruder equipped with means for injecting fluid substances. In such a procedure, promoter can be injected at a point sufficiently upstream from the melt exit (the die) to achieve good mixing, but also sufficiently close to the die that any cross-linking that may occur inside the extruder does not impede melt exit from the extruder.

When polyamide is used as cross-linking promoter, fluoropolymer and polyamide are preferably melt-blended together under high shear. The ingredients can first be combined in desired proportions and blended with each other in the dry state, such as by tumbling in a drum, or can be combined by simultaneous or separate metering of the feed of one or more of the components to the melt blending device. Preferably, the melt blending is done in a twin screw extruder, such as manufactured by Werner & Pfleiderer or by Berstorff. Numerous other high shear melt blending devices, as known to those skilled in the art, can be used without departing from the spirit of the invention. When polyamide is used as cross-linking promoter, the fluoropolymer is the continuous phase of a melt blend and the polyamide is present in the fluoropolymer as a dispersed phase.

The composition of the present invention can contain additives such as commonly used in thermoplastics, including stabilizers, pigments, fillers, e.g., glass or graphite, and the like. Such additives are "inert" in the sense that they do not participate in the cross-linking in an essential way.

Cross-linking can be reflected by changes in various properties. Typically, melt viscosity, and tensile strength increase, while tensile elongation at break decreases. Hardness and or flex modulus can also increase to indicate that cross-linking has occurred. For cross-linking of the present invention, substantial increases in flex modulus have been observed. See Example 2, which discloses an increase of more than 100%. Such large increases are not required to conclude that cross-linking has taken place. For example, an increase of 25%, or of 10%, would indicate that cross-linking has occurred. Alternatively or additionally, cross-linking of fluoropolymer having pendant functional groups in the presence of cross-linking promoter is indicated by a decrease of melt flow rate (MFR) (increase of melt viscosity). Again, see Example 2 which shows a decrease of MFR to zero. As with flex modulus, such large changes are not required to conclude that cross-linking has occurred. For example, a decrease in MFR of 30%, or even of 15%, would indicate that cross-linking has occurred.

The fluoropolymer resin in the composition of the invention is melt-fabricable, and, thus, can be converted to shaped articles by melt processing techniques such as extrusion, injection molding, compression molding, transfer molding, and the like. For fabrication by such techniques, melt viscosity (MV) is usually in the range of $0.5 \times 10^3$ to $100 \times 10^3$ Pa·s as conventionally measured for the particular fluoropolymer, though MV outside this range is known. Preferably, MV is in the range of $1–25 \times 10^3$ Pa·s. If the fluoropolymer resin is a blend of fluoropolymers, the MV of each fluoropolymer component is usually within the aforesaid ranges, but blending can permit components to have MV in a wider range, as will be understood by one skilled in the art. For fluoropolymers, MV is calculated from melt flow rate (MFR) measured according to a modification of ASTM D-1238. For example, see U.S. Pat. No. 4,380,618 and the ASTM Standards cited below for specific fluoropolymers. MV is inversely related to MFR by an expression that depends on the test conditions and the density of the polymer.

As used herein, "functionalized fluoropolymer" means fluoropolymer having functional side groups or functional groups attached to side groups, i.e., pendant functional groups. Usually, but not necessarily, such functional units are at the ends of the pendant side groups. Fluoropolymer that does not have such pendant functional groups is sometimes described herein as "non-functional fluoropolymer". Thus, non-functional fluoropolymer and functionalized fluoropolymer differ at least by the presence in the latter of pendant functional groups. Non-functional fluoropolymer can be a precursor to functionalized fluoropolymer, in which instance the process of functionalizing involves addition of functional groups to the non-functional polymer. However, "functionalizing" is also used in a broader sense herein to include preparation of functionalized fluoropolymer which would be non-functional if pendant functional groups were not present, even though non-functional fluoropolymer may not be the precursor.

Functional groups, in the context of the present invention, are groups capable of participating in cross-linking reactions, when functional groups and cross-linking promoter are both present in a fluoropolymer composition. Such functional groups can be introduced, for example, by incorporating into the fluoropolymer, during polymerization, monomer units having such functional groups, i.e., functional monomers, or by having a compound grafted thereto which imparts polar functionality to the fluoropolymer. Such grafted fluoropolymer includes the grafted fluoropolymer powder described in U.S. Pat. No. 5,576,106 and the grafted fluoropolymer described in EP 0 650 987. Other known methods of grafting can be used. Preferred polar-grafted fluoropolymers include the surface-grafted powder of the '106 patent. Examples of polar functionality provided by grafting include acids, including carboxylic, sulfonic and phosphonic acids, and esters and salts thereof, and epoxides. Glycidyl methacrylate is an example of a grafting compound that provides epoxide functionality. Among compounds for grafting onto and thereby becoming part of the polar-grafted fluoropolymer, maleic acid and maleic anhydride (MAnh) are preferred. Maleic anhydride can be halogen-substituted, e.g., dichloromaleic anhydride and difluoromaleic anhydride.

Functional groups that can participate in cross-linking reactions include ester, alcohol, acid (including carbon-, sulfur-, and phosphorus-based acid) and salt and halide thereof. Other functionalities include anhydride and epoxide. Preferred functional groups include anhydride, especially maleic anhydride. As one skilled in the art will recognize, more than one type of functional group can be present. Normally, however, a single type of functional group is used.

The concentration of functional groups in the fluoropolymer resin component, i.e., in the functionalized fluoropolymer or in functionalized fluoropolymer plus non-functional fluoropolymer, if non-functional fluoropolymer is present, of the melt-fabricable fluoropolymer composition of this invention is effective to achieve cross-linking. As will be recognized by one skilled in the art, the concentration of functional groups that is effective to achieve cross-linking may vary at least with the type of functional group and with the type of cross-linking promoter. The concentration of functional groups present can be expressed relative to the number of main chain carbon atoms in the fluoropolymer resin. Generally, the concentration of functional groups present is at least about $25/10^6$ main chain C atoms, based on total fluoropolymer in the composition. The concentration of functional groups is usually in the range of $25-2500$ per $10^6$ main chain C atoms, preferably in the range of $50-2000$ per $10^6$ main chain C atoms, based on total fluoropolymer present.

The desired concentration of functional groups in the functionalized fluoropolymer resin can be achieved with a single fluoropolymer having functional groups, or a mixture of such fluoropolymers. The desired concentration of functional groups can also be achieved by blending functionalized fluoropolymer (or mixtures thereof) having a higher concentration of functional groups with non-functional fluoropolymer (or mixtures thereof), i.e., fluoropolymer having essentially no functional groups. In this embodiment, functionalized fluoropolymer acts as a functional group concentrate that can be let down (diluted) with non-functional fluoropolymer. This approach has the advantage of permitting one to achieve a variety of functional group concentrations with a single functionalized fluoropolymer by varying the blending ratio with non-functional fluoropolymer, and is a preferred embodiment of the invention. Preferably, in a functionalized fluoropolymer that is a blend, the functionalized fluoropolymer component is in minor amount relative to non-functional fluoropolymer component.

Thus, in one embodiment of the present invention, the cross-linkable fluoropolymer composition contains minor amounts of functionalized fluoropolymer and a major amount of non-functional fluoropolymer. By "major amount" is meant at least 50 wt %, preferably at least 70 wt %, of non-functional fluoropolymer based on combined weight of non-functional fluoropolymer and functional fluoropolymer. Thus, in one embodiment of the present invention, the cross-linkable fluoropolymer composition contains minor amounts of functionalized fluoropolymer and a major amount of non-functional fluoropolymer. By "major amount" is meant at least 50 wt %, preferably at least 70 wt %, of non-functional fluoropolymer based on combined weight of non-functional fluoropolymer and functional fluoropolymer. In this embodiment of the invention, then, the concentration of functional groups in the functionalized fluoropolymer will be high enough so that the average concentration of functional groups in the functional fluoropolymer plus the non-functional fluoropolymer will be at least about $25/10^6$ main chain C atoms, usually in the range of $25-2500$ per $10^6$ main chain C atoms, and preferably in the range of $50-2000$ per $10^6$ main chain C atoms.

A wide variety of fluoropolymers can be used. The fluoropolymer is made from at least one fluorine-containing monomer, but may incorporate monomer which contains no fluorine or other halogen. Fluorinated monomers include those which are fluoroolefins containing 2 to 8 carbon atoms and fluorinated vinyl ether (FVE) of the formula $CY_2$=CYOR or $CY_2$=CYOR'OR wherein Y is H or F and —R is a completely fluorinated or partially fluorinated linear or branched alkyl group containing 1 to 8 carbon atoms. —R'— is a completely fluorinated or partially fluorinated linear or branched alkylene group containing 1 to 8 carbon atoms. Preferred R groups contain 1 to 4 carbon atoms and are preferably perfluorinated. Preferred R' groups contain 2 to 4 carbon atoms and are preferably perfluorinated. Hydrocarbon monomers that can be used include ethylene, propylene, n-butylene, and iso-butylene. When the fluoropolymer is functionalized by grafting, preferably at least one monomer contains hydrogen, and in that regard the hydrogen/fluorine atomic ratio in the polymer is preferably at least 0.1/1. The fluoropolymer, however, preferably contains at least 35 wt % fluorine. Fluoropolymer resins that can be used include copolymers of tetrafluoroethylene (TFE) with one or more copolymerizable monomers chosen from perfluoroolefins having 3–8 carbon atoms and perfluoro(alkyl vinyl ethers) (PAVE) in which the linear or branched alkyl group contains 1–5 carbon atoms. Preferred perfluoropolymers include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro (ethyl vinyl ether) (PEVE) and perfluoro(propyl vinyl ether) (PPVE). Preferred fluoropolymers also include the copolymers of ethylene with perhalogenated monomers such as TFE or chlorotrifluoroethylene (CTFE), such copolymers being often referred to as ETFE and ECTFE, respectively. In the case of ETFE, minor amounts of additional monomer are commonly used to improve properties such as reduced high temperature brittleness. PPVE, PEVE, perfluorobutyl ethylene (PFBE), and hexafluoroisobutylene (HFIB) are preferred additional comonomers. ECTFE may also have additional modifying comonomer. Other fluoropolymers that can be used include vinylidene fluoride ($VF_2$) polymers including homopolymers and copolymers with other perfluoroolefins, particularly HFP and optionally TFE. TFE/HFP copolymer which contains a small amount of $VF_2$, which copolymer is often referred to as THV, can also be used. Examples of perfluorinated copolymers include TFE with HFP and/or PPVE or PEVE. Representative fluoropolymers are described, for example, in ASTM Standard Specifications D-2116, D-3159, and D-3307. Such fluoropolymers are usually partially-crystalline as indicated by a non-zero heat of fusion associated with a melting endotherm as measured by differential scanning calorimetry (DSC) on first melting. Alternatively or additionally, preferred fluoropolymers are non-elastomeric, as opposed to elastomeric.

Functionalized fluoropolymers include fluoropolymers such as those described in the foregoing paragraph and additionally containing copolymerized units derived from functional monomers. If the concentration of functional monomer is high enough in a TFE copolymer, however, no other comonomer may be needed. Usually, but not necessarily, the functional groups introduced by such monomers are at the ends of pendant side groups. Examples of functional monomers that introduce pendant side groups having desired functionality include the same ethylenically unsaturated compounds recited above as grafting compounds. Such functional monomers can be incorporated into fluoropolymers, for example, by polymerization in a medium of $CO_2$ as illustrated by example below. Functional monomers that introduce pendant side groups having desired functionality can also have the general formula $CY_2$=CY-Z wherein Y is H or F and Z contains a functional group. Preferably, Y is F and -Z is —$R_f$—X, wherein $R_f$ is a fluorinated diradical and X is a functional group that may contain $CH_2$ groups. Preferably, $R_f$ is linear or branched perfluoroalkoxy having 2–20 carbon atoms, so that the functional comonomer is a fluorinated vinyl ether. Examples of such fluorovinylethers include $CF_2$=$CF[OCF_2CF(CF_3)]_m$—O—$(CF_2)_n CH_2OH$ as disclosed in U.S. Pat. No. 4,982,009 and the alcoholic ester $CF_2$=$CF[OCF_2CF(CF_3)]_m$—O—$(CF_2)_n$—$(CH_2)_p$—O—CO as disclosed in U.S. Pat. No. 5,310,838. Additional fluorovinylethers include $CF_2$=$CF[OCF_2CF(CF_3)]_m O(CF_2)_n COOH$ and its carboxylic ester $CF_2$=$CF[OCF_2CF(CF_3)]_m O(CF_2)_n COOR$ disclosed in U.S. Pat. No. 4,138,426. In these formulae, m=0–3, n=1–4, p=1–2 and R is methyl or ethyl. Preferred such fluorovinylethers include $CF_2$=$CF[OCF_2CF(CF_3)]O(CF_2)_2$—$CH_2$—OH. These fluorovinylethers are useful because of their ability to incorporate into the polymer and their ability to incorporate functionality into the resultant copolymer. Preferred comonomers that introduce pendant functional groups include maleic anhydride, dichloromaleic anhydride, difluoromaleic anhydride, and maleic acid.

When functionalized fluoropolymer is achieved by copolymerization, the amount of functional monomer in the functionalized fluoropolymer of this invention is small to achieve the desired concentration of functional groups, even when functionalized fluoropolymer is a blend comprising non-functional fluoropolymer. Generally, the amount of functional monomer is no more than 10 wt %, preferably no more than 5 wt %, based on total weight of functionalized fluoropolymer, i.e., the fluoropolymer component containing the functional monomer. In certain instances, higher concentrations of functional monomer exceeding 10 wt % may be desired, for example, when it is not desired to use a non-functional monomer in the functionalized melt-fabricable fluoropolymer. While the functionalized fluoropolymer can be uniform, it is not necessary to have a uniform concentration of functional monomer throughout the functionalized fluoropolymer.

When pendant functional groups are introduced into the melt-fabricable fluoropolymer by halogen-free entities, e.g., maleic anhydride or maleic acid, either by grafting or by copolymerizing, the amount of grafting compound grafted to the fluoropolymer or the amount of functional comonomer incorporated into the fluoropolymer will generally be in the range of 0.01–1.0 wt %, preferably 0.02–0.5 wt %, based on total fluoropolymer present in the composition. If the composition contains both non-functional fluoropolymer and functionalized fluoropolymer, the functionalized fluoropolymer will have larger amounts of grafted compound or copolymerized comonomer units depending on the proportion of functionalized fluoropolymer in the composition. Generally, the amount of maleic anhydride or maleic acid is in the range of 0.05 wt % to 5 wt % based on the total weight of functionalized fluoropolymer in such a fluoropolymer blend. Preferably, the amount of maleic anhydride or maleic acid in the functionalized fluoropolymer component of a blend is 0.1–3 wt %, more preferably 0.1–1 wt %.

EXAMPLES

Unless otherwise specified, the fluoropolymer used in examples below is a copolymer (ETFE) of ethylene (E), tetrafluoroethylene (TFE), and perfluorobutyl ethylene (PFBE) having E/TFE molar ratio of about 0.9, about 1 mol % of PFBE, and melt flow rate (MFR) of 7.4 g/10 min. The polymer is prepared generally by the method of U.S. Pat. No. 3,624,250 as a finely-divided fluff or powder. This fluff is refined by passing it through a comminuting machine (Fitzmill®, Fitzpatrick Co.) using a screen with 0.04-inch (1.0-mm) openings. Average particle size is about 100–120 □m as determined by U.S. Standard screen analysis. Unless otherwise specified, the powder exiting the Fitzmill® (ETFE powder) is used without fractionation. Maleic anhydride is grafted to the ETFE powder surface by the irradiation process disclosed by Kerbow in U.S. Pat. No. 5,576,106 to obtain a grafted maleic anhydride concentration of about 0.30 wt %. The grafted ETFE powder is formed into granules by compacting with a roll compactor and then granulating with a hammer mill (FitzMill®).

The concentration of grafted maleic anhydride in ETFE compositions used is determined by the method of Kerbow in U.S. Pat. No. 5,576,106 using the infrared absorption peak at about 1795 cm$^{-1}$ and a multiplicative factor of 3.8 to convert absorbance/mil of sample thickness (0.97 to convert absorbance/mm) to concentration in wt %.

The concentration of copolymerized maleic anhydride and dichloro-maleic anhydride in TFE/PEVE copolymers exemplified below is estimated by Fourier transform infrared (FTIR) spectroscopy. A solution of 0.1 g of succinic anhydride in 10 mL of ethanol in a 0.102-mm $CaF_2$ cell gives absorptivities of 1765 cm$^2$/g at 1867 cm$^{-1}$ and 10,894 cm$^2$/g at 1790 cm$^{-1}$. When cold pressed as thin films, the TFE/PEVE/MAnh terpolymers show peaks at about 1897 cm$^{-1}$ and about 1820 cm$^{-1}$. The latter is used to estimate copolymerized MAnh concentration, assuming that copolymerized maleic anhydride has the same absorptivity as ethanolic succinic anhydride. An absorption band at about 2365 cm$^{-1}$ that has been widely used as an internal thickness band is used to measure film thickness. The spectrum of a commercial TFE/PPVE copolymer (Teflon® PFA fluoropolymer resin grade 340) control sample is subtracted prior to calculation.

Melt flow rate (MFR) of ETFE resins is measured according to ASTM Method D-3159. Unless otherwise specified, MFR of PFA resins (copolymers of TFE and PAVE) is measured according to ASTM D-3307. When MFR is too high too measure accurately using the specified 5 kg weight, a 2160 g weight is used, and melt viscosity (MV) is calculated from the MFR so that comparisons can be made with measurements taken with the 5 kg weight. The equation used is $$MV=(Wt \cdot Or^4 \cdot \rho \cdot 18681.18)/(Pr^2 \cdot O_L \cdot MFR),$$

where

Or is the orifice radius in inches (0.04125 in, 1.04775 mm)

$\rho$ is polymer density, taken as 2.16 g/cc

Pr is the piston radius in inches (0.1865 in, 4.7371 mm)

$O_L$ is the orifice land length in inches (0.315 in, 8.001 mm)

As noted, MFR is sometimes measured at a temperature of 350° C. to assess cross-linking. Hardness (Shore D) is measured according to ASTM D-2240 and flex modulus is measured according to ASTM D-790.

Example 1

In a 1-L glass vessel, 0.5 g of para-phenylenediamine (PPD) is dissolved in 200 mL of acetone. Then 50 g of grafted ETFE granules prepared as outlined above are added and the slurry is stirred with a magnetic stir bar. A light yellow color is observed. After 1 hr of stirring at room temperature, the light yellow solid is filtered, placed in a Soxhlet extraction thimble and extracted with acetone for 5 hr to remove all PPD that has not reacted with anhydride groups. The polymer solids are then dried in a vacuum oven at 125° C. for 12 hr. For the resin so treated with PPD, no flow is obtained in an attempt to measure MFR, indicating that cross-linking had occurred. The infrared (IR) spectrum of the above PPD-modified sample, obtained by Fourier transform IR spectroscopy on a hot-pressed specimen, shows amide functionality clearly, indicating that cross-linking is through amide linkages created by reaction of amine and anhydride. When the experiment is repeated with ETFE powder without grafted maleic anhydride and having MFR of 4.4 g/10 min, the powder treated with PPD has MFR of 4.2 g/10 min, indicating that pendant functional groups are important for effective cross-linking of fluoropolymer by the process of the present invention.

Example 2

A stock solution of 2 g of PPD in 100 mL of acetone is prepared. A 30-mL aliquot of this solution is mixed with 100 g of grafted ETFE granules prepared as outlined above to produce a PPD concentration in the mixture of 0.6 wt % based on ETFE resin. Then, the mixture is evaporated to dryness at room temperature in a laboratory hood overnight. The PPD-treated granules are used to mold a 1.5-mm-thick sheet as specified in ASTM D-3159, from which specimens are cut for tensile, hardness, and flex modulus testing. Tensile testing is done according to ASTM D-3159, except that Type IV bars (ASTM D-638) are used instead of microtensile specimens. Data are shown in Table 1, along with corresponding data for a similar ETFE resin that has not been grafted (Control A) and for the grafted ETFE granules (Control B), both without PDD. Thermal cross-linking of the functional fluoropolymer in the presence of polyfunctional nucleophile is indicated by the changes in all properties presented, most notably by the increase in flex modulus and by the decrease in MFR. The cross-linking occurs during the molding of the sheet, for which the molding temperature was 300° C. as specified in the ASTM specification.

TABLE 1

Test Results for Example 2 and Controls

| Property: | Example | | |
|---|---|---|---|
|  | A | B | 2 |
| Tensile strength (MPa) | 29.2 | 28.1 | 34.6 |
| Elongation (%) | 200 | 141 | 130 |
| Hardness (Shore D) | 50 | 54 | 79 |
| Flex modulus (MPa) | 1069 | 1165 | 2655 |
| MFR (g/10 min) | 6.0 | 3.2 | 0 |

Example 3

Grafted ETFE granules prepared as outlined above are blended in various proportions (nominally 20/80, 35/65, 50/50 by weight) with cubes of an ETFE resin having E/TFE molar ratio of about 0.9, about 1 mol % of PFBE, and MFR of 6.0 g/10 min, and having no pendant functional groups. The granules and cubes are dry-blended, and the resultant mixtures are melt-blended using a standard single-screw extruder with a metering screw having a mixing section, and the extrudate is strand-cut into cubes. The concentrations of grafted maleic anhydride in the blends are given in Table 2. A 2-mL aliquot of the PPD/acetone stock solution of Example 2 is added to 7 g of each of the blend cubes and the unblended components. The mixtures are dried as before to obtain compositions containing 0.6 wt % of deposited PPD. The PPD-treated cubes or granules are placed in the melt flow rate measuring unit at 300° C. or 340° C., held at temperature for 5 or 10 min with the piston in place before the weight was added to the piston, and then subjected to MFR measurement. MFR values, also given in Table 2, show that cross-linking occurs in the presence of polyfunctional nucleophile at both temperatures for all concentrations of pendant functional groups, and that the degree of cross-linking increases with concentration of functional groups. An asterisk identifies the MFR values for the 10-min hold period; all others are for the 5-min hold. The effect of time at elevated temperature is addressed in Example 5.

TABLE 2

Blend Characteristics and Results for Example 3

| Blend (gran/cube) | Graft (wt %) | MFR (g/10 min) | |
|---|---|---|---|
|  |  | at 300° C. | at 340° C. |
| 0/100 | 0. | 7.2 | 17.6 |
| 20/80 | 0.034 | 4.0* | — |
| 35/65 | 0.061 | 1.8 | 5.2 |
| 50/50 | 0.12 | 0.0* | 1.0 |
| 100/0 | 0.30 | 0.0 | 0.0 |

*10-min hold. All others 5-min hold.

Example 4

This example illustrates the effect of polyfunctional nucleophile concentration on cross-linking. The procedures of Example 3 are essentially repeated, using the blend cubes having a maleic anhydride graft concentration of 0.061 wt % (Example 3) but with PPD concentration being varied by diluting the stock solution. A sample having no PPD present is prepared in a similar way but by using neat acetone. All MFR measurements are made following a 5-min hold at stated temperature. Data presented in Table 3 show that cross-linking occurs when polyfunctional nucleophile is present, and that the degree of cross-linking increases with concentration of polyfunctional nucleophile.

TABLE 3

MFR Results for Example 4

| PPD (wt %) | MFR (g/10 min) | |
|---|---|---|
|  | at 300° C. | at 340° C. |
| 0.0 | 6.5 | 21.6 |
| 0.1 | 3.4 | 6.8 |
| 0.6 | 1.8 | 5.2 |

Example 5

This example illustrates the effect of time on cross-linking. The MFR measurement procedure is essentially repeated, using the blend cubes having a maleic anhydride graft concentration of 0.061 wt % and treated to have PPD concentration of 0.1 wt % (as in, Example 4), but with the hold time at temperature being varied from 5 min to 20 min. Together with the MFR value in Example 4 for the sample with no PPD present, these results indicate that a substantial part of the cross-linking that will occur takes place within 5 min, and most within 10 min, since MFR appears to be asymptotically approaching a value in the 1.5–1.8 g/10 min range.

| Hold time (min) | MFR at 300° C. (g/10 min) |
|---|---|
| 5 | 3.4 |
| 10 | 2.3 |
| 20 | 1.8 |

Polymer Preparation 1

TFE/PEVE/MAnh Copolymer

A 1-liter vertical stirred reactor is charged with 0.5 g of maleic anhydride (MAnh) and is closed. The reactor is purged with $CO_2$ by several times charging with $CO_2$ and venting. The reactor is heated to 40° C., and the agitator is started at 800 rpm. The reactor is then charged to a pressure of 1300 psig (9.1 MPa) with a $TFE/CO_2$/ethane mixture of 185 g of TFE, 470 g of $CO_2$ and 2.19 g of ethane, and 30 mL of PEVE are injected. Then, 15 mL of a 0.68 wt % solution of $[CF_3CF_2CF_2OCF(CF_3)COO]_2$ initiator in $CF_3CF_2OCF(CF_3)CF_2OCFHCF_3$ is injected. When this amount of initiator solution has been injected, the rate of addition of the same solution is reduced to 0.16 mL/min and this initiator feed is continued to the end of the polymerization. A feed of a $TFE/CO_2$ mixture is also started at the rate of 116 g/hr of TFE and 77 g/hr of $CO_2$ and is continued for 1.5 hr. After 1.5 hr, all feeds and the agitator are stopped, the reactor is vented and opened, and 134 g of polymer solids are recovered as a white powder after devolatilizating for 1 hr at 100° C. in a vacuum oven. The TFE copolymer contains 3.4 wt % of PEVE and 0.08 wt % of Manh as determined by Fourier transform infrared spectroscopy. The melting point ($T_m$) is 306° C. MFR measurement using a 2160 g weight is 9.79. MV based on this is $2.35 \times 10^3$ Pa·s. This copolymer is designated as "Polymer 1".

Polymer Preparations 2–4

MAnh and Dichloro-MAnh Copolymers

Polymers 2–4 (P2-P4) are prepared by essentially following the above procedure, except that the amount of PEVE is 32 mL, dichloromaleic anhydride is used in one instance, and the amounts of some precharged ingredients are varied as shown in Table 4. Yields, polymer compositions, and polymer properties are also given in Table 4. MFR data for P2 and P4 are obtained with 2160 g weight.

TABLE 4

Conditions and Results for Polymer Preparations 2–4

|  | P2 | P3 | P4 |
|---|---|---|---|
| Conditions: | | | |
| Anhydride type | MAnh | MAnh | Dichloro |
| Anhydride (g) | 1.0 | 2.0 | 2.0 |
| TFE charge (g) | 189 | 187 | 189 |
| $CO_2$ charge (g) | 480 | 475 | 480 |
| Ethane charge (g) | 1.92 | 1.90 | 1.92 |

TABLE 4-continued

Conditions and Results for Polymer Preparations 2–4

|  | P2 | P3 | P4 |
|---|---|---|---|
| Results: | | | |
| Polymer (g) | 133 | 139 | 139 |
| PEVE (wt %) | 3.1 | 2.9 | 2.3 |
| Anhydride (wt %) | 0.28 | 0.33 | 0.10 |
| $T_m$ (° C.) | 305 | 306 | 307 |
| MFR | 4.57 | 12.94 | 7.68 |
| MV ($10^3$ Pa·s) | 5.04 | 4.12 | 3.00 |

Example 6

The general procedure of Example 3 is followed using Polymer 1 (Polymer Preparation 1) and cubes of a commercial TFE/PPVE copolymer resin (Teflon® PFA fluoropolymer resin grade 340, DuPont), except that the Polymer 1 powder and the PFA 340 cubes are dry-blended only and not melt-blended, and the amount of deposited PPD is 0.57 wt %. MFR data in Table 5, with a 5-min hold before application of the weight, show that cross-linking occurs in the presence of cross-linking promoter for polymers having pendant functional groups introduced by copolymerization.

TABLE 6

Blend Characteristics and Results for Example 6

|  | MFR at 350° C. (g/10 min) | |
|---|---|---|
| Blend (P1/340) | No PPD | 0.57 w % PPD |
| 0/100 | 11.3 | 10.7 |
| 50/50 | 27.5 | 0 |
| 100/0 | — | 0 |

Example 7

Polymers P1, P3 and P4 are exposed to various amines and then MFR is measured. The general procedure followed is to dissolve about 0.1 g of amine in 10 g of acetone dried over type 4A molecular sieves, and to "wet" about 4 g of polymer powder with 11 g of dry acetone. These two preparations are then combined and the mixture is agitated for 0.8–1.5 hr in an ultrasonic bath at ambient temperature, or in one instance shaken by hand and allowed to stand for 2 hr. The polymers solids are then separated from the mixture by vacuum filtering, washed twice with acetone, and dried at 90° C. in a vacuum oven at 10 inches of Hg (34 kPa) before measuring MFR (at 372° C.).

When this procedure is followed for aniline used in conjunction with P3 and P4, or diethyl amine in conjunction with P3, MFR is zero. When this procedure is essentially followed for methylene dianiline in conjunction with P1, except that the amount of P1 is 3 g, MFR is also zero. For the combination of methylene dianiline and P1, FTIR prior to MFR measurement indicates that about 40% of the anhydride groups have reacted with the methylene dianiline.

When this procedure is essentially followed for aniline in conjunction with P1, except that the amount of aniline is only 0.03 g, MV was $4.4 \times 10^4$ Pa·s, a substantial increase from the original value of $2.35 \times 10^3$ Pa·s (Polymer Preparation 1).

These results show that cross-linking occurs in the presence of cross-linking promoter for polymers having pendant functional groups introduced by copolymerization, and that monofunctional and polyfunctional compounds are both effective as cross-linking promoters.

Example 8

A 50-mL beaker containing approximately 5.5 g of Polymer P3 is placed in a wide mouthed glass jar. About 5 mL of 30% ammonium hydroxide are carefully placed in the bottom of the jar, outside of the beaker, and the jar is closed with the lid. Thus, the polymer is exposed to $NH_3$ vapor without contact with the liquid. After about 8 hr, the beaker is removed from the jar and the now light yellow resin is placed in a vacuum oven at 90° C. for 1 hr. MFR is zero, showing the effectiveness of ammonia as a cross-linking promoter for fluoropolymers having pendant functional groups.

Example 9

The procedure of Example 8 is essentially repeated, except that grafted ETFE granules are used instead of Polymer P3 and the exposure time to $NH_3$ vapor is about 20 hr. MFR is reduced from 7.7 g/10 min before exposure to 2.3 g/10 min after exposure, showing the effect of ammonia as a cross-linking promoter.

Examples 7–9 demonstrate the process of infusing a cross-linking promoter into the fluoropolymer having pendant functional groups to obtain effective cross-linking of the functionalized fluoropolymer. Thus, a shaped article which is produced by melt fabrication and which contains a fluoropolymer having pendant functional groups may be cross-linked by infusing a cross-linking promoter, such as ammonia, preferably followed by heating the shaped article.

Example 10

Melt blends of grafted ETFE granules and cubes of ETFE resin having no pendant functional groups, and having granule/cube ratios of 20/80, 30/70 and 50/50, are prepared as in Example 3. Each of the resultant ETFE blend cubes, and the cubes of ETFE resin having no pendant functional groups, are then blended in various proportions with a 6,6-polyamide (Zytel® nylon resin grade 101, DuPont, hereafter "nylon") by melt mixing with one or two passes through a 25-mm Brabender parallel twin screw extruder operating at 180 rpm and at an external barrel temperature of 330° C. Nylon concentrations are given in weight parts per hundred parts of total fluoropolymer (phr). MFR is measured normally and after a 30 min hold at temperature before application of the weight. MFR values in Table 7 show that thermal cross-linking of fluoropolymer having pendant functional groups occurs in the presence of polymeric cross-linking promoter, in this case of polyamide.

TABLE 7

MFR Data for Example 10

| ETFE Blend | Nylon (phr) | MFR (g/10 min) | |
|---|---|---|---|
| | | Initial | 30-min hold |
| 0/100 | 5 | 10.2 | — |
| 20/80 | 5 | 2.10 | 2.08 |
| 20/80 | 10 | 1.91 | 1.56 |

TABLE 7-continued

MFR Data for Example 10

| ETFE Blend | Nylon (phr) | MFR (g/10 min) | |
|---|---|---|---|
| | | Initial | 30-min hold |
| 30/70 | 15 | 2.07 | 1.91 |
| 30/70 | 20 | 2.12 | 1.72 |
| 50/50 | 30 | 2.99 | 0.68 |

The examples show that polymers having pendant functional groups introduced by copolymerization are cross-linked in the presence of cross-linking promoters, and that monofunctional and polyfunctional compounds are each effective as cross-linking promoters. The degree of cross-linking varies with the amount of cross-linking promoter added. Therefore the degree of cross-linking can be selected for the specific end use: greater cross-linking where stiffer or harder articles are desired; less cross-linking to preserve flexibility while increasing resistance to change in physical properties as temperature increases.

Furthermore, the examples show the simplicity of the process for addition of cross-linking promoter to the polymer with pendant functional groups. The cross-linking promoter may be introduced by infusion from liquid or vapor phase. In this way it is possible first, to mold the article from fluoropolymer having pendant functional groups, second, to infuse the cross-linking promoter, and third, to heat the infused article to crosslink the polymer.

What is claimed is:

1. A process for cross-linking a melt-fabricable thermoplastic non-elastomeric fluoropolymer having pendant functional groups, comprising combining said fluoropolymer with amine before melt fabrication of said fluoropolymer into a shaped article is completed, and then completing said melt fabrication.

2. The process of claim 1 wherein the amount of said amine present is no more than 2 wt % based on the weight of said fluoropolymer.

3. The process of claim 1 wherein said melt fabrication is extrusion or injection molding.

4. A process for cross-linking a melt-fabricable thermoplastic fluoropolymer having pendant functional groups, comprising melt fabricating a shaped article from said fluoropolymer and infusing said article with amine, said infusing being carried out below the melting temperature of said fluoropolymer.

5. The process of claim 4 wherein said infused article is heated to additionally thermally cross-link the fluoropolymer.

6. The process of claim 4, wherein said fluoropolymer is a blend of fluoropolymer which is free of said functional groups and fluoropolymer which has said functional groups.

7. The process of claim 4 wherein said functional groups are selected from the group consisting of ester, acid, salt and halide of said acid, epoxide, and anhydride.

8. The process of claim 7 wherein said anhydride is derived from maleic anhydride.

9. The process of claim 4 wherein said fluoropolymer is at least one polymer selected from the group consisting of perfluorinated copolymer, copolymer of ethylene with tetrafluoroethylene or chlorotrifluoroethylene, and vinylidene fluoride homopolymer and copolymer with perfluoroolefin, or said functional groups are pendant from polymerized monomer present in said fluoropolymer, said monomer having the formula $CF_2=CFR_fX$, wherein $R_f$ is a fluorinated diradical and X is said functional groups.

10. The process of claim 4 wherein said amine is ammonia.

11. A process for cross-linking a melt-fabricable thermoplastic fluoropolymer having pendant anhydride functional groups, comprising melt fabricating a shaped article from said fluoropolymer and infusing said article with amine, said infusing being carried out below the melting temperature of said fluoropolymer.

12. The process of claim 11 wherein said anhydride is maleic anhydride.

13. A process for cross-linking a melt-fabricable thermoplastic fluoropolymer having pendant functional groups, comprising melt fabricating a shaped article from said fluoropolymer and infusing said article with ammonia, said infusing being carried out below the melting temperature of said fluoropolymer.

14. The process of claim 1 wherein said melt fabrication is carried out in the absence of catalyst in said fluoropolymer.

15. The process of claim 1 wherein said amine is monofunctional.

16. The process of claim 1 wherein said fluoropolymer is a blend of fluoropolymer which is free of said functional groups and fluoropolymer which has said functional groups.

* * * * *